United States Patent
Okai

(10) Patent No.: US 6,682,153 B2
(45) Date of Patent: Jan. 27, 2004

(54) METHOD FOR DETECTING OUTPUT-STUCK FAULT OF CAR BODY ACCELERATION SENSOR, APPARATUS FOR DETECTING OUTPUT-STUCK FAULT OF CAR BODY ACCELERATION SENSOR, AND ANTI-LOCK BRAKING SYSTEM FOR CAR

(75) Inventor: Takayuki Okai, Yokosuka (JP)

(73) Assignee: Bosch Automotive Systems Corporation, Tokyo (JP)

( * ) Notice: Subject to any disclaimer, the term of this patent is extended or adjusted under 35 U.S.C. 154(b) by 0 days.

(21) Appl. No.: 10/222,061

(22) Filed: Aug. 16, 2002

(65) Prior Publication Data

US 2003/0038537 A1 Feb. 27, 2003

(51) Int. Cl.[7] .................................................. B60T 8/88
(52) U.S. Cl. ................... 303/122.05; 303/122; 701/34; 701/76
(58) Field of Search ................ 303/122.05, 122.03, 303/122, 122.02, 182, 199, 183, 192, 171, 181; 73/1.37, 1.75, 510, 514.02; 701/70, 76, 92, 34, 74, 71; 180/197; 702/141

(56) References Cited

U.S. PATENT DOCUMENTS

| | | | | |
|---|---|---|---|---|
| 5,212,640 A | * | 5/1993 | Matsuda | 701/34 |
| 5,265,472 A | * | 11/1993 | Pfeifle et al. | |
| 5,483,452 A | * | 1/1996 | Tanaka | 701/70 |
| 6,305,760 B1 | * | 10/2001 | Otake | 303/122.05 |
| 6,493,618 B2 | * | 12/2002 | Nada | 701/34 |

FOREIGN PATENT DOCUMENTS

| | | |
|---|---|---|
| JP | 01195168 | 8/1989 |
| JP | 08184610 | 7/1996 |

OTHER PUBLICATIONS

Translation of submitted JP195168 and JP 184610.*

* cited by examiner

*Primary Examiner*—Douglas C. Butler
(74) *Attorney, Agent, or Firm*—Priest & Goldstein, PLLC

(57) ABSTRACT

By a method for detecting an output-stuck fault of a car body acceleration sensor, an absolute value of a relative difference between the logical car body acceleration operated on the basis of a wheel speed and the physical car body acceleration output from a car body acceleration sensor is obtained, and the obtained absolute value of the relative difference is compared with a first rated value. When the absolute value of the relative difference exceeds the first rated value, a fail counter is made to start to count up at that point of time. When a counted value of the fail counter exceeds one second during the absolute value of the relative difference is exceeding the first rated value, the difference of the maximum value and the minimum value of the physical car body acceleration during the period is compared with a second rated value. When the difference is less than the second rated value, it is judged that the car body acceleration sensor is in its output-stuck fault state in which the output of the sensor does not change to be left to be fixed.

16 Claims, 3 Drawing Sheets

METHOD FOR DETECTING OUTPUT-STUCK FAULT OF CAR BODY ACCELERATION SENSOR, APPARATUS FOR DETECTING OUTPUT-STUCK FAULT OF CAR BODY ACCELERATION SENSOR, AND ANTI-LOCK BRAKING SYSTEM FOR CAR

BACKGROUND OF THE INVENTION

1. Field of the Invention

The present invention relates to a method for detecting an output-stuck fault of a car body acceleration sensor installed in a car having an anti-lock braking system for a car, an apparatus for detecting the output-stuck fault of the car body acceleration sensor, the anti-lock braking system for a car, and a program for detecting the output-stuck fault of the car body acceleration sensor.

2. Description of the Related Art

It is possible to obtain a wheel deceleration signal necessary for the control of an anti-lock braking system (hereinafter, referred to as an "ABS") of a two-wheel drive car having undriven wheels easily. However, if a center differential and a rear wheel shaft differential are locked and four wheels are in the state of being directly connected with each other in a four-wheel drive car, all of the wheels are connected with an engine having a large moment of inertia. Consequently, the response speeds of the wheels to the changes of braking torque are remarkably decreased. Hence, it is almost impossible to obtain any wheel deceleration signals, and thereby the wheels are locked.

As one of means for solving such a problem, a four-wheel drive car is generally provided with a car body acceleration sensor. The four-wheel drive car measures car body acceleration in a traveling direction of the car body with the car body acceleration sensor, and judges that a road surface is one having a low value of frictional resistance $\mu$ (hereinafter, referred to as a "low $\mu$ road surface") when deceleration at the time of braking is smaller than a fixed value. Then, the four-wheel drive car switches the slip control logic of its ABS from that for a road surface having a high value of frictional resistance $\mu$ (hereinafter, referred to as a "high $\mu$ road surface") to that for a low $\mu$ road surface to increase the control accuracy of the ABS. Thereby, the four-wheel drive car prevents the locking of its wheels.

Consequently, the car body acceleration sensor is indispensable to the ABS of a four-wheel drive car. If the car body acceleration sensor is broken down, there is the possibility that the slip control of the car becomes impossible to make the wheels be locked. Therefore, the fault detection of the car body acceleration sensor can be concluded to be indispensable. Several fault modes can be supposed as the fault modes of a car body acceleration sensor. One of them is an output-stuck fault by which the car body acceleration output signal does not follow the acceleration of the car body and not to change with a fixed car body acceleration signal being output.

As first prior art for detecting an output-stuck fault of a car body acceleration sensor, a technique disclosed in a Japanese Patent Laid-Open Publication No. Hei 1-195168 is known. By the disclosed technique, the car body acceleration operated on the basis of an output of a wheel speed sensor is compared with the car body acceleration detected by the car body acceleration sensor when the control of an ABS is not performed. If the result of the comparison is a predetermined value or more, the car body acceleration sensor is judged to be in its output-stuck fault state.

However, for example, when a car ascends or descends a sloping road having a large angle of inclination, there is the possibility that a large difference is produced between the car body acceleration operated on the basis of an output of the wheel speed sensor and the car body acceleration detected by the car body acceleration sensor, though the car body acceleration sensor is normal. Consequently, there is the possibility that an output-stuck fault is erroneously detected.

Moreover, as second prior art that solves the defect of the first prior art, a technique disclosed in Japanese Patent Laid-Open Publication No. Hei 8-184610 is known. By the disclosed technique, the car body acceleration to work on a car body by the gravity supposed to be applied to the car body when the car ascends or descends a sloping road having a sufficiently large angle of inclination is set to be a threshold value. And, when the car body acceleration operated on the basis of an output of the wheel speed sensor of the car is larger than the set threshold value and the car body acceleration detected by the car body acceleration sensor is smaller than the threshold value, the car body acceleration sensor of the car is judged to be in its output-stuck fault state. Moreover, the following conditions are defined as the other conditions for the judgment of the car body acceleration sensor being in its output-stuck fault: the control of the ABS of the car is not performed; the car body is traveling; and the speed differences of a plurality of wheels are a predetermined speed difference.

As it is described above, in the above-mentioned second prior art, the car body acceleration to work on the car body by the gravity at the time when the car ascends or descends the sloping road having the sufficiently large angle of inclination is set to be the threshold value, and thereby it is prevented to detect the output-stuck fault erroneously at the time when the car ascends or descends the sloping road having the large angle of inclination though the car body acceleration sensor is normal.

However, by the above-mentioned second prior art, an output-stuck fault of a car body acceleration sensor can be detected only when a car ascends or descends a sloping road having a sufficiently large angle of inclination, or only when the car body acceleration corresponding to such a case works on a car body. And, for example, when a car travels on a flat low $\mu$ road surface, the car body acceleration working on the car body of the car is small. Consequently, there is the possibility that, even if an output-stuck fault of the car body acceleration sensor occurs, the output-stuck fault cannot be detected by the prior art and thereby the ABS for a car does not operate normally.

SUMMARY OF THE INVENTION

The present invention was made in view of such situations, and the invention aims to provide a method for detecting an output-stuck fault of a car body acceleration sensor, an apparatus for detecting an output-stuck fault of a car body acceleration sensor, an anti-lock braking system for a car, and a program for detecting an output-stuck fault of a car body acceleration sensor wherein the method, the apparatus, the system and the program do not erroneously detect any output-stuck fault when a car ascends or descends a sloping road having a large angle of inclination though the car body acceleration sensor is normal and can exactly detect any output-stuck faults of the car body acceleration sensor even in the situation in which car body acceleration working on the car body is small.

A first aspect of the present invention is for achieving the above-mentioned object, and the aspect is a method for detecting an output-stuck fault of a car body acceleration sensor installed in a car having an ABS for a car, the method comprising the steps of: operating a relative acceleration difference between the logical car body acceleration operated on the basis of a wheel speed and the physical car body acceleration detected by the car body acceleration sensor; measuring a duration time of a state in which the acceleration difference is exceeding a rated value $\alpha$; storing the minimum acceleration and the maximum acceleration of the physical car body acceleration during the state in which the acceleration difference is exceeding the rated value $\alpha$; and judging that the car body acceleration sensor is in its output-stuck fault state if a difference between the stored minimum acceleration and the stored maximum acceleration is a rated value $\beta$ or less at the point of time when the duration time of the state in which the acceleration difference is exceeding the rated value $\alpha$ exceeds a rated time.

In the method for detecting an output-stuck fault of a car body acceleration sensor of the first aspect, at first, the relative acceleration difference between the logical car body acceleration operated on the basis of the wheel speed and the physical car body acceleration detected by the car body acceleration sensor is operated by the comparison of the logical car body acceleration and the physical car body acceleration. Consequently, it becomes possible to detect any output-stuck fault of the car body acceleration sensor even if the car body acceleration working on the car body is small. And, in the method, the duration time of the state in which the acceleration difference is exceeding the rated value $\alpha$ is measured, and it is judged that the car body acceleration sensor is in its output-stuck fault state at the point of time when the duration time exceeds the rated time. Consequently, there is little possibility that an erroneous output-stuck fault is detected even if instantaneous strong car body acceleration works on the car body owing to a difference in level of a road surface, or the like.

Hereupon, the rated value $\alpha$ is set to be the maximum value of relative acceleration differences between a logical car body acceleration curve and a physical car body acceleration curve that have the possibility of being continuously generated as long as the car body acceleration sensor is normally working, and the rated value $\alpha$ is obtained on the basis of experiments or the like. Incidentally, it is preferable that the rated value $\alpha$ is as small as possible within a range in which there is no possibility of any erroneous detection of the output-stuck fault. Setting the rated value $\alpha$ to be a small value makes it possible to detect the output-stuck fault at a high sensibility. Moreover, the rated time is set to be longer than a period of time during which the relative acceleration difference between the logical car body acceleration curve and the physical car body acceleration curve is continuously exceeding the rated value $\alpha$ as long as the car body acceleration sensor is normally working, and the rated time is obtained on the basis of experiments or the like. Incidentally, it is preferable that the rated time is as short as possible within a range in which there is no possibility of detecting any erroneous output-stuck fault. By setting the rated time to be short, it becomes possible to detect the output-stuck fault in a shorter time.

Moreover, by the method, the minimum acceleration and the maximum acceleration of the physical car body acceleration during the state in which the acceleration difference is exceeding the rated value $\alpha$ are stored. Then, by the method, it is judged that the car body acceleration sensor is in its output-stuck fault state only if the difference between the stored minimum acceleration and the stored maximum acceleration of the physical car body acceleration is the rated value $\beta$ or less at the point of time when the duration time of the state in which the acceleration difference is exceeding the rated value $\alpha$ exceeds the rated time. Hereupon, the rated value $\beta$ is set to be the maximum value of the range of changes of the acceleration output by the car body acceleration sensor in the state of its output-stuck fault, and the rated value $\beta$ is obtained on the basis of experiments or the like. Incidentally, it is preferable that the rated value $\beta$ is as small as possible within a range in which there is no possibility of detecting any erroneous output-stuck fault. By setting the rated value $\beta$ to be small, it becomes possible to detect the output-stuck fault with a high degree of precision.

Thereby, it can be judged whether or not the acceleration difference is generated by the changes of the car body acceleration working on the car body owing to the gravity when the car ascends or descends a sloping road having a large angle of inclination at the point of time when the acceleration difference has continuously been exceeding the rated value $\alpha$ for a period longer than the rated time. That is, if the car body acceleration sensor is in its output-stuck fault state, the car body acceleration output from the car body acceleration sensor should not change. When a car ascends or descends a sloping road having a large angle of inclination in a normal state of the car body acceleration sensor, the car body acceleration output from the car body acceleration sensor greatly changes. Thereby, the fault of the car body acceleration sensor can be detected.

Consequently, according to the method for detecting an output-stuck fault of a car body acceleration sensor of the first aspect of the present invention, the following operation and advantages can be obtained. That is, no erroneous output-stuck fault is detected when a car ascends or descends a sloping road having a large angle of inclination or the like though a car body acceleration sensor is normal. And further it becomes possible to detect an output-stuck fault of the car body acceleration sensor precisely in the situation in which the car body acceleration working on a car body is small.

A second aspect of the present invention is a method for detecting an output-stuck fault of a car body acceleration sensor installed in a car having an ABS for a car, the method comprising the steps of: operating a relative change quantity difference between a change quantity of the logical car body acceleration per unit time, the change quantity being operated on the basis of a wheel speed, and a change quantity of the physical car body acceleration per unit time, the physical car body acceleration being detected by the car body acceleration sensor; measuring a duration time of a state in which the change quantity difference is exceeding a rated value $\alpha$; storing the maximum value of the change quantity of the physical car body acceleration per unit time during the state in which the change quantity difference is exceeding the rated value $\alpha$; and judging that the car body acceleration sensor is in its output-stuck fault state if the stored maximum value of the change quantity is a rated value $\beta$ or less at the point of time when the duration time of the state in which the change quantity difference is exceeding the rated value $\alpha$ exceeds a rated time.

As it is described above, in the method for detecting an output-stuck fault of a car body acceleration sensor of the second aspect, the relative change quantity difference between the change quantity of the logical car body acceleration per unit time, which has been operated on the basis of the wheel speed, and the change quantity of the physical car body acceleration per unit time, which has been detected by the car body acceleration sensor is operated by the comparison of the change quantities to each other.

Consequently, it becomes possible to detect any output-stuck fault of the car body acceleration sensor even if the car body acceleration working on the car body is small. And, in the method, the duration time of the state in which the change quantity difference is exceeding the rated value α is measured, and it is judged that the car body acceleration sensor is in its output-stuck fault state at the point of time when the duration time exceeds the rated time. Consequently, by the method, there is little possibility that an erroneous output-stuck fault is detected even if the change quantity of the car body acceleration per unit time instantaneously changes owing to a difference in level of a road surface, or the like.

Hereupon, the rated value α is set at a value larger than the maximum value of the change quantity differences that have the possibility of being continuously generated as long as the car body acceleration sensor is normally working, and the rated value α is obtained by experiments or the like. Incidentally, it is preferable that the rated value α is as small as possible within a range in which there is no possibility of any erroneous detection of the output-stuck fault. Setting the rated value α to be a small value makes it possible to detect the output-stuck fault with a high degree of sensibility. Moreover, the rated time is set to be longer than the period of time during which the change quantity difference has the possibility of exceeding the rated value α continuously as long as the car body acceleration sensor is normally working, and the rated time is obtained by experiments or the like. Incidentally, it is preferable that the rated time is as short as possible within a range in which there is no possibility of detecting any erroneous output-stuck fault. By setting the rated time to be short, it becomes possible to detect the output-stuck fault in a shorter time.

Moreover, in the method, the maximum value of the change quantity of the physical car body acceleration per unit time during the state in which the change quantity difference is exceeding the rated value α is stored. Then, by the method, it is judged that the car body acceleration sensor is in its output-stuck fault state only if the maximum value of the change quantity of the stored car body acceleration per unit time is the rated value β or less at the point of time when the duration time of the state in which the change quantity difference is exceeding the rated value α exceeds the rated time. Hereupon, the rated value β is set to be the maximum value of the range of change in the acceleration output by the car body acceleration sensor in the state in which the car body acceleration sensor is in its output-stuck fault, and the rated value β is obtained by experiments or the like. Incidentally, it is preferable that the rated value β is as small as possible within a range in which there is no possibility of detecting any erroneous output-stuck fault. By setting the rated value β to be small, it becomes possible to detect the output-stuck fault with a high degree of precision.

Thereby, by the method, it can be judged whether or not the change quantity difference is generated by the changes of the car body acceleration working on the car body owing to the gravity when the car ascends or descends a sloping road having a large angle of inclination at the point of time when the change quantity difference is continuously exceeding the rated value α for a period longer than the rated time. That is, if the car body acceleration sensor is in its output-stuck fault state, the car body acceleration output from the car body acceleration sensor should not change. When a car ascends or descends a sloping road having a large angle of inclination in a normal state of the car body acceleration sensor, the car body acceleration output from the car body acceleration sensor greatly changes. Thereby, the output-stuck fault of the car body acceleration sensor can be judged.

Moreover, in the method, the relative change quantity difference between the change quantity of the logical car body acceleration per unit time, which has been operated on the basis of a wheel speed, and the change quantity of the physical car body acceleration per unit time, which has been detected by the car body acceleration sensor is operated by the comparison of the change quantities to each other. Consequently, the detection of an output-stuck fault of the car body acceleration sensor is not influenced by the discrepancy of the relative acceleration difference between the logical car body acceleration and the physical car body acceleration. Hence, it becomes possible to detect any output-stuck fault of the car body acceleration sensor with a higher degree of precision than that obtained by the operation of the relative acceleration difference of the car body acceleration by the comparison of the logical car body acceleration with the physical car body acceleration.

Consequently, according to the method for detecting an output-stuck fault of a car body acceleration sensor of the second aspect of the present invention, like the first aspect of the invention, the following operation and advantages can be obtained. That is, no erroneous output-stuck fault is detected when a car ascends or descends a sloping road having a large angle of inclination though a car body acceleration sensor is normal. And further it becomes possible to detect an output-stuck fault of the car body acceleration sensor precisely in the situation in which the car body acceleration working on a car body is small. Furthermore, in addition to the above-mentioned operation and advantages, by the method for detecting an output-stuck fault of a car body acceleration sensor according to the second aspect, the detection of the output-stuck fault of the car body acceleration sensor is not influenced by a discrepancy between the logical car body acceleration and the physical car body acceleration as the relative acceleration difference. Consequently, it becomes possible to detect any output-stuck fault of the car body acceleration sensor with a higher degree of accuracy than that obtained by the operation of a relative acceleration difference of the car body acceleration by the comparison of the logical car body acceleration with the physical car body acceleration.

A third aspect of the present invention is a method for detecting an output-stuck fault of a car body acceleration sensor according to the first and the second aspects, wherein the method performs the detection of the output-stuck fault of the car body acceleration sensor only when the control of the ABS is not executed and the car is traveling at a predetermined speed or more.

Because there is the possibility that a large difference is produced between a car body speed and a wheel speed at the time of the performance of the ABS control, the possibility of detecting an erroneous output-stuck fault of the car body acceleration sensor is produced thereby. Accordingly, by executing the detection of an output-stuck fault of the car body acceleration sensor when the control of the ABS is not performed, it becomes possible to decrease the possibility of the detection of the erroneous output-stuck fault of the car body acceleration sensor.

Moreover, the wheel speed when a car is stopping is zero, and the car body acceleration at that time is also zero. However, there is the possibility that the output of the car body acceleration sensor changes owing to factors such as the getting on and off of a person, the loading and the unloading of cargoes, the stopping of a car at a sloping road, and the like. Consequently, there is the possibility that an output-stuck fault of a car body acceleration sensor is erroneously detected by the changes. Accordingly, in the method according to the third aspect, the detection of an output-stuck fault of a car body acceleration sensor is performed while a car is traveling at a predetermined speed or more, namely when the car is not stopping, and thereby it becomes possible to decrease the possibility of the erroneous detection of any output-stuck fault of a car body acceleration sensor.

Thereby, by the method for detecting an output-stuck fault of a car body acceleration sensor according to the third aspect of the present invention, the operation and advantages such that the possibility of the erroneous detection of an output-stuck fault of a car body acceleration sensor can be decreased by the performance of the detection of the output-stuck fault of a car body acceleration sensor only when the control of the ABS of a car is not executed and the car is traveling at a predetermined speed or more, in addition to the operation and the advantages of the first and the second aspects of the present invention.

A fourth aspect of the present invention is a method for detecting an output-stuck fault of a car body acceleration sensor according to any one of the first to the third aspects, the method further comprising the steps of: lighting a fault indicating lamp to inform the fault to a driver when the car body acceleration sensor is judged to be in its output-stuck fault state; and storing a fault code in a non-volatile storage medium.

As it is described above, in the method of the aspect, the fault indicating lamp installed in the inside of a car is lighted to inform the driver of some fault of the ABS of the car and the stopping of the function of the control of the ABS when the car body acceleration sensor is judged to be in its output-stuck fault. Consequently, it becomes possible that the driver recognizes the information and acts suitably in response to it. Moreover, on the other hand, in the method, the fault code is stored in the non-volatile storage medium. Consequently, it becomes possible for the driver to know that the cause of the lighting of the fault indicating lamp is the output-stuck fault of the car body acceleration sensor by referring to the fault code.

Thereby, by the method for detecting an output-stuck fault of a car body acceleration sensor according to the fourth aspect of the present invention, the operation and the advantages such that it is possible to urge an appropriate action of the driver by informing the driver of the fault of the ABS at the time of an output-stuck fault of the car body acceleration sensor and it is also possible to make the driver recognize that the indication of the fault by the ABS is caused by the output-stuck fault of the car body acceleration sensor, in addition to the operation and the advantages of any one of the first to the third aspects of the present invention.

A fifth aspect of the present invention is an apparatus for detecting an output-stuck fault of a car body acceleration sensor installed in a car having an ABS for a car, the apparatus comprising: a wheel speed sensor outputting an alternating current signal having a frequency proportional to a rotational speed of a wheel of the car; a control section having an operation function for operating a wheel speed by receiving the alternating current signal from the wheel speed sensor to compute car body acceleration logically on the basis of the wheel speed; and a car body acceleration sensor for detecting car body acceleration physically to output the detected car body acceleration to the control section; wherein the control section comprises: means for operating a relative acceleration difference between the logical car body acceleration operated on the basis of the wheel speed and the physical car body acceleration detected by the car body acceleration sensor; means for measuring a duration time of a state in which the acceleration difference is exceeding a rated value $\alpha$; means for storing the minimum acceleration and the maximum acceleration of the physical car body acceleration during the state in which the acceleration difference is exceeding the rated value $\alpha$; and means for judging that the car body acceleration sensor is in its output-stuck fault state if a difference between the stored minimum acceleration and the stored maximum acceleration is a rated value $\beta$ or less at the point of time when the duration time of the state in which the acceleration difference is exceeding the rated value $\alpha$ exceeds a rated time.

The apparatus for detecting an output-stuck fault of a car body acceleration sensor according to the fifth aspect of the present invention can obtain the similar operation and the similar advantages to those of the above-mentioned first aspect of the present invention.

A sixth aspect of the present invention is an apparatus for detecting an output-stuck fault of a car body acceleration sensor installed in a car having an ABS for a car, the apparatus comprising: a wheel speed sensor outputting an alternating current signal having a frequency proportional to a rotational speed of a wheel of the car; a control section having an operation function for operating a wheel speed by receiving the alternating current signal from the wheel speed sensor to compute car body acceleration logically on the basis of the wheel speed; and a car body acceleration sensor for detecting car body acceleration physically to output the detected car body acceleration to the control section; wherein the control section comprises: means for operating a relative change quantity difference between a change quantity of the logical car body acceleration per unit time, the change quantity being operated on the basis of the wheel speed, and a change quantity of the physical car body acceleration per unit time, the physical car body acceleration being detected by the car body acceleration sensor; means for measuring a duration time of a state in which the change quantity difference is exceeding a rated value $\alpha$; means for storing a maximum value of the change quantity of the physical car body acceleration per unit time during the state in which the change quantity difference is exceeding the rated value $\alpha$; and means for judging that the car body acceleration sensor is in its output-stuck fault state if the stored maximum value of the change quantity is a rated value $\beta$ or less at the point of time when the duration time of the state in which the change quantity difference is exceeding the rated value $\alpha$ exceeds a rated time.

The apparatus for detecting an output-stuck fault of a car body acceleration sensor according to the sixth aspect of the present invention can obtain the similar operation and the similar advantages to those of the above-mentioned second aspect of the present invention.

A seventh aspect of the present invention is an apparatus for detecting an output-stuck fault of a car body acceleration sensor according to the fifth or the sixth aspect, wherein the control section further comprises means for performing the detection of the output-stuck fault of the car body acceleration sensor only when the control of the ABS is not executed and the car is traveling at a predetermined speed or more.

The apparatus for detecting an output-stuck fault of a car body acceleration sensor according to the seventh aspect of the present invention can obtain the similar operation and the similar advantages to those of the above-mentioned third aspect of the present invention.

An eighth aspect of the present invention is an apparatus for detecting an output-stuck fault of a car body acceleration sensor according to any one of the fifth to the seventh aspects, wherein the control section further comprises: means for lighting a fault indicating lamp to inform the fault to a driver when the control section judges that the car body acceleration sensor is in its output-stuck fault state; and means for storing a fault code in a non-volatile storage medium.

The apparatus for detecting an output-stuck fault of a car body acceleration sensor according to the eighth aspect of the present invention can obtain the similar operation and the similar advantages to those of the above-mentioned fourth aspect of the present invention.

A ninth aspect of the present invention is an apparatus for detecting an output-stuck fault of a car body acceleration sensor according to any one of the fifth to the eighth aspects, wherein the car body acceleration sensor is an analog G-sensor.

The analog G-sensor is composed of an electric circuit using a Hall element, and can detect the acceleration, which works on a car body, in the longitudinal direction by the fine step, and can output the detected acceleration. Because the analog G-sensor is composed of the electric circuit, it cannot be known at which value the value of the car body acceleration is stuck when, for example, one of the electric elements of the analog G-sensor is destroyed owing to some factor and the output of the car body acceleration signal is stuck. Moreover, there is also the possibility that the stuck output signal somewhat changes.

The apparatus for detecting an output-stuck fault of a car body acceleration sensor according to the ninth aspect of the present invention can detect any output-stuck fault of a car body acceleration sensor using the above-mentioned analog G-sensor with a high degree of precision owing to the operation and the advantages of any one of the fifth to the eighth aspects of the present invention.

A tenth aspect of the present invention is an ABS for a car, the system being equipped with an apparatus for detecting an output-stuck fault of a car body acceleration sensor according to any one of the fifth to the ninth aspects.

According to the ABS for a car of the tenth aspect of the present invention, the operation and the advantages of any one of the fifth to the ninth aspects can be obtained in the ABS for a car.

An eleventh aspect of the present invention is a program for detecting an output-stuck fault of a car body acceleration sensor, the program being for making a computer execute the detection of the output-stuck fault of the car body acceleration sensor installed in a car having an ABS for a car, the program comprising the steps of: operating a relative acceleration difference between logical car body acceleration operated on the basis of a wheel speed and physical car body acceleration detected by the car body acceleration sensor; measuring a duration time of a state in which the acceleration difference is exceeding a rated value $\alpha$; storing the minimum acceleration and the maximum acceleration of the physical car body acceleration during the state in which the acceleration difference is exceeding the rated value $\alpha$; and judging that the car body acceleration sensor is in its output-stuck fault state if a difference between the stored minimum acceleration and the stored maximum acceleration is a rated value $\beta$ or less at the point of time when the duration time of the state in which the acceleration difference is exceeding the rated value $\alpha$ exceeds a rated time.

By the program for detecting an output-stuck fault of a car body acceleration sensor according to the eleventh aspect of the present invention, not only the similar operation and the similar advantages to those of the first aspect, which are described above, of the present invention can be obtained, but also the similar operation and the similar advantages to those of the first aspect, which are described above, can be brought about in an arbitrary car equipped with an ABS for a car capable of executing the program for detecting an output-stuck fault of a car body acceleration sensor.

A twelfth aspect of the present invention is a program for detecting an output-stuck fault of a car body acceleration sensor, the program being for making a computer execute the detection of the output-stuck fault of the car body acceleration sensor installed in a car having an ABS for a car, the program comprising the steps of: operating a relative change quantity difference between a change quantity of logical car body acceleration per unit time, the change quantity being operated on the basis of a wheel speed, and a change quantity of physical car body acceleration per unit time, the physical car body acceleration being detected by the car body acceleration sensor; measuring a duration time of a state in which the change quantity difference is exceeding a rated value $\alpha$; storing the maximum value of the change quantity of the physical car body acceleration per unit time during the state in which the change quantity difference is exceeding the rated value $\alpha$; and judging that the car body acceleration sensor is in its output-stuck fault state if the stored maximum value of the change quantity is a rated value $\beta$ or less at the point of time when the duration time of the state in which the change quantity difference is exceeding the rated value $\alpha$ exceeds a rated time.

By the program for detecting an output-stuck fault of a car body acceleration sensor according to the twelfth aspect of the present invention, not only the similar operation and the similar advantages to those of the second aspect, which are described above, of the present invention can be obtained, but also the similar operation and the similar advantages to those of the second aspect, which are described above, can be brought about in an arbitrary car equipped with an ABS for a car capable of executing the program for detecting an output-stuck fault of a car body acceleration sensor.

A thirteenth aspect of the present invention is a program for detecting an output-stuck fault of a car body acceleration sensor according to the eleventh or the twelfth aspect, the program further comprising the step of performing the detection of the output-stuck fault of the car body acceleration sensor only when the control of the ABS is not executed and the car is traveling at a predetermined speed or more.

By the program for detecting an output-stuck fault of a car body acceleration sensor according to the thirteenth aspect of the present invention, not only the similar operation and the similar advantages to those of the third aspect, which are described above, of the present invention can be obtained, but also the similar operation and the similar advantages to those of the third aspect, which are described above, can be brought about in an arbitrary car equipped with an ABS for a car capable of executing the program for detecting an output-stuck fault of a car body acceleration sensor.

A fourteenth aspect of the present invention is a program for detecting an output-stuck fault of a car body acceleration sensor according to any one of the eleventh aspect to the thirteenth aspect, the program further comprising the steps of: lighting a fault indicating lamp to inform the fault to a driver when the car body acceleration sensor is judged to be in the output-stuck fault state; and storing a fault code in a non-volatile storage medium.

By the program for detecting an output-stuck fault of a car body acceleration sensor according to the fourteenth aspect of the present invention, not only the similar operation and the similar advantages to those of the fourth aspect, which are described above, of the present invention can be obtained, but also the similar operation and the similar advantages to those of the fourth aspect, which are described above, can be brought about in an arbitrary car equipped with an ABS for a car capable of executing the program for detecting an output-stuck fault of a car body acceleration sensor.

BRIEF DESCRIPTION OF THE DRAWINGS

The above and other objects, features and advantages of the present invention will become more apparent from the following description of the presently preferred exemplary embodiments of the invention taken in conjunction with the accompanying drawings, in which.

DESCRIPTION OF THE PREFERRED EMBODIMENTS

Hereinafter, an embodiment of the present invention is described on the basis of the attached drawings.

Figure 1:
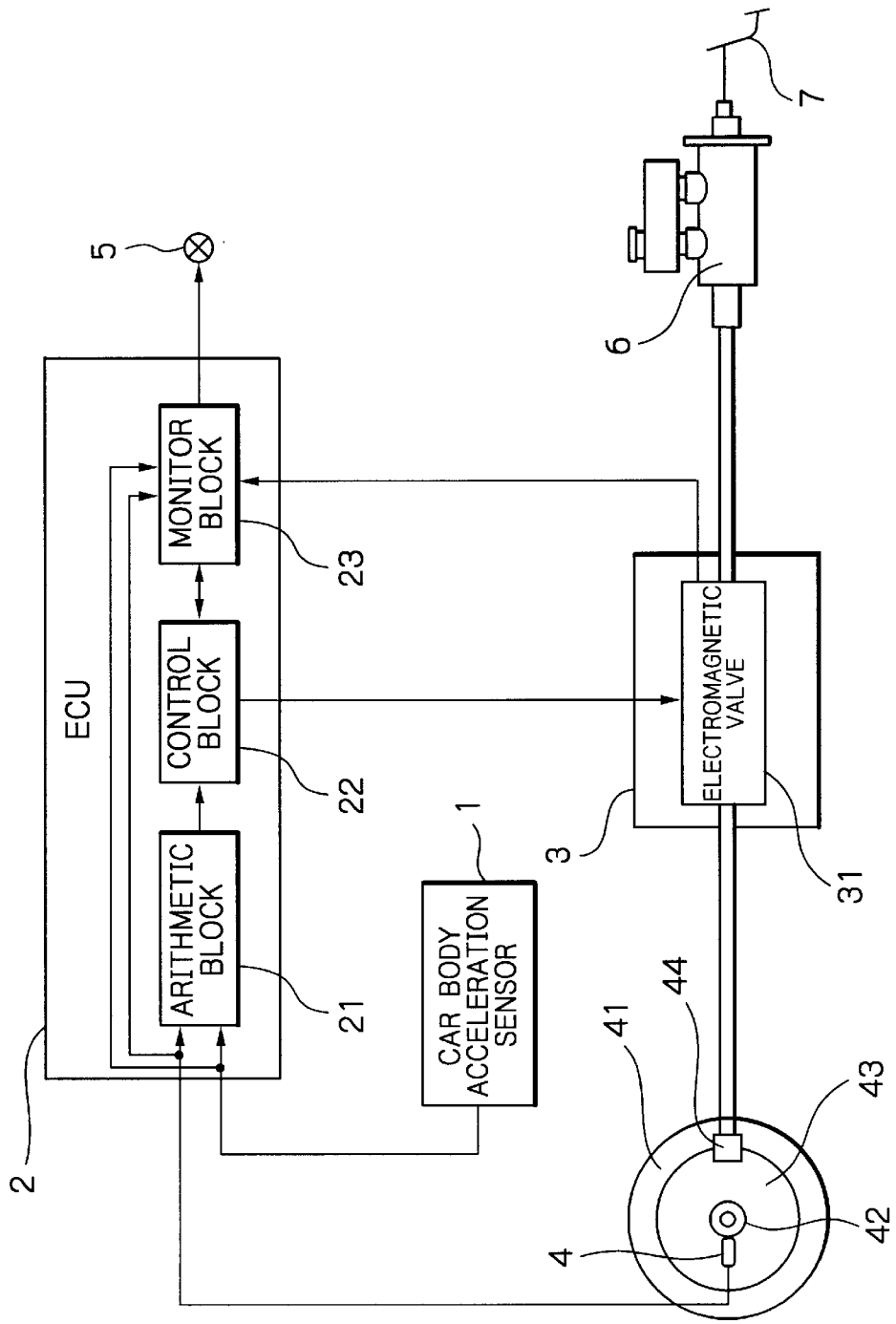
FIG. 1 is a schematic block diagram showing the system configuration of an ABS for a car, which is equipped with a car body acceleration sensor, according to an embodiment of the present invention.

FIG. 1 is a schematic block diagram showing the system configuration of an ABS for a car, which is equipped with a car body acceleration sensor, according to the present invention.

The basic configuration of the ABS for a car is composed of a wheel speed sensor 4, an electronic control unit (ECU) as the control section of the present invention, and a hydraulic pressure unit 3.

The wheel speed sensor 4 detects the teeth of a gear 42 rotating together with a wheel 41 to generate an alternating current signal having a frequency proportional to the rotational speed of the wheel 41.

The ECU 2 is equipped with an arithmetic block 21 having an operation function for computing a slip ratio and acceleration and deceleration of the wheel 41 on the basis of the wheel speed obtained by the operation of the input alternating current signal transmitted from the wheel speed sensor 4. Moreover, the ECU 2 is further equipped with a control block 22 having a control function for generating a control instruction to a brake pressure by combining the input slip ratio and the input acceleration and the input deceleration of the wheel, which have been computed by the arithmetic block 21, logically, and for transferring the generated control instruction to the hydraulic pressure unit 3. Moreover, the ECU 2 is equipped with a monitor block 23 having a system monitoring function which performs the function check and the monitoring of each component and the whole of the system and, when a fault occurs somewhere in components and the system, stops the control function of the ABS after warning a driver against the fault with a warning lamp 5, a not shown warning buzzer, or the like and enables an ordinary brake to operate.

The hydraulic pressure unit 3 is disposed between a master cylinder 6 and a wheel cylinder 44. The hydraulic pressure unit 3 increases and decreases the brake pressure to a brake disc 43 in accordance with the tread force of a brake pedal 7. Separately from the operation, the hydraulic pressure unit 3 receives a control instruction from the ECU 2 to drive an electromagnetic valve 31, a not shown pump, a not shown motor and the like. Thereby, the hydraulic pressure unit 3 increases or decreases the brake pressure of a car directly or indirectly in accordance with the control instruction.

A car body acceleration sensor 1 is a sensor for detecting acceleration in the traveling direction of the car. And, the car body acceleration output from the car body acceleration sensor 1 is input into the arithmetic block 21 of the ECU 2. The ECU 2 judges that the road surface on which the car is traveling is a low $\mu$ road surface when the deceleration detected by the car body acceleration sensor 1 is smaller than a fixed value. Then, the control block 22 switches its slip control logic from that for a high $\mu$ road surface to that for a low $\mu$ road surface to heighten its control accuracy, and thereby prevents the lock of the wheel 41. Moreover, the faults of the car body acceleration sensor 1 are monitored by the monitor block 23. Furthermore, the car body acceleration sensor 1 in the present embodiment is an analog G-sensor. The analog G-sensor is composed of an electric circuit using a Hall element, and can detect the acceleration, which works on a car body, in the longitudinal direction by the fine step, and can output the detected acceleration. Incidentally, the car body acceleration sensor 1 is not especially limited to the analog G-sensor, and it is possible to implement the present invention by the use of a car body acceleration sensor 1 based on another principle.

Hereinafter, a timing chart and a flowchart are referred while a description is given to an output-stuck fault detection procedure of the car body acceleration sensor 1 according to the present invention in the ABS having the basic configuration described above.

Figure 2:
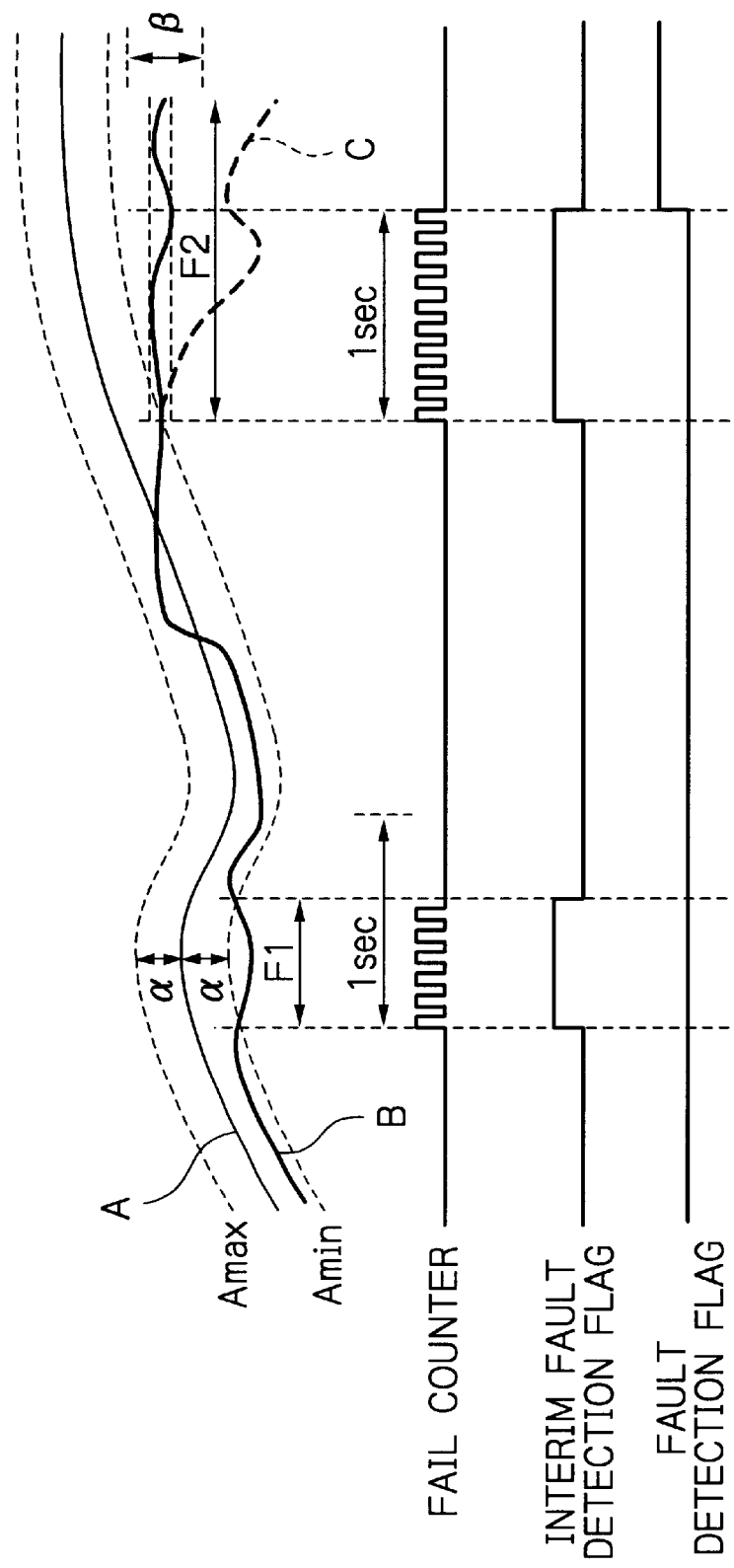
FIG. 2 is a timing chart showing a timing of detecting an output-stuck fault of the car body acceleration sensor according to the embodiment of the present invention.

FIG. 2 is a timing chart showing a timing of detecting an output-stuck fault of the car body acceleration sensor according to the present invention.

A curve designated by a reference mark A is a logical car body acceleration curve showing logical car body acceleration operated from wheel speeds. A curve designated by a reference mark B is a physical car body acceleration curve showing physical car body acceleration detected by the car body acceleration sensor 1. Moreover, a curve of a broken line designated by a reference mark Amax is a car body acceleration curve made of the addition of a rated value $\alpha$ to the logical car body acceleration curve A, as it is shown in the figure. A curve of a broken line designated by a reference mark Amin is a car body acceleration curve made of the subtraction of the rated value $\alpha$ from the logical car body acceleration curve A, as it is shown in the figure.

Hereupon, as it has been described above, the rated value $\alpha$ is set to be the maximum value of relative acceleration differences between the logical car body acceleration curve A and the physical car body acceleration curve B, which are capable of being generated continuously as long as the car body acceleration sensor 1 is working normally, and the rated value $\alpha$ is obtained by experiments or the like. Incidentally, it is preferable that the rated value $\alpha$ is as small as possible within a range in which there is no possibility of detecting any erroneous output-stuck fault. The smaller the rated value $\alpha$ is, at the higher degree of sensitivity the output-fault can be detected. Consequently, no detection of the output-stuck fault of the car body acceleration sensor 1 is performed while the physical car body acceleration curve B is changing within a region between the car body acceleration curve Amax and the car body acceleration curve Amin. Incidentally, the rated value α is set about 1.47 m/S² in the present embodiment. Moreover, although the axis of ordinate and the axis of abscissa are not shown in FIG. 2, the above-mentioned car body acceleration curves A, B, Amax and Amin are plotted by taking car body acceleration on the axis of ordinate and time on the axis of abscissa.

A fail counter counts a duration time during which the physical car body acceleration curve B is continuously changing outside the region between the car body acceleration curve Amax and the car body acceleration curve Amin. That is, the fail counter measures the duration time during which the relative acceleration difference between the logical car body acceleration curve A and the physical car body acceleration curve B is exceeding the rated value α. Moreover, while the fail counter is counting the duration time during which the relative acceleration difference is exceeding the rated value α, an interim fault detection flag is set. The interim fault detection flag indicates that the relative acceleration difference is exceeding the rated value α, and then indicates that the relative acceleration difference having the possibility of the occurrence of an output-stuck fault of the car body acceleration sensor 1 has been generated. Consequently, at the point of time when the interim fault detection flag is set, the ECU 2 does not judge that the car body acceleration sensor is in its output-stuck fault state yet.

Then, if a duration time during which the relative acceleration difference is exceeding the rated value α is a rated time or shorter, the interim fault detection flag is reset. Hereupon, the rated time is set to be longer than the period of time during which the relative acceleration difference between the logical car body acceleration curve A and the physical car body acceleration curve B has the possibility of exceeding the rated value α continuously as long as the car body acceleration sensor 1 is working normally, as it has been described above. And the rated time is obtained by experiments or the like. That is, as it is shown by a reference mark F1 in FIG. 2, if the duration time during which the relative acceleration difference is exceeding the rated value α is one second, which is the rated time, or shorter, the ECU 2 judges that the exceeding of the relative acceleration difference occurred by instantaneous strong car body acceleration working on the car body owing to, for example, a difference in level of a road surface, or the like, and the ECU 2 resets the interim fault detection flag to continue the detection processing of output-stuck faults.

On the other hand, if a duration time during which the relative acceleration difference is exceeding the rated value α exceeds the rated time, the ECU 2 operates and computes the difference of the maximum value and the minimum value of the physical car body acceleration while the relative acceleration difference is exceeding the rated value α, and compares the computed difference with a rated value β. Hereupon, the rated value β is set to be the maximum value of the range of change of the acceleration which the car body acceleration sensor 1 can output in the state in which the car body acceleration sensor 1 is in its output-stuck fault state. And the rated value β is obtained by experiments or the like. That is, as it is shown by a reference mark F2 in FIG. 2, at the point of time when the duration time during which the relative acceleration difference is exceeding the rated value α exceeds one second, which is the rated time, the ECU 2 judges whether or not the above-mentioned relative acceleration difference exceeding the rated value α is caused by an output-stuck fault of the car body acceleration sensor 1.

Incidentally, the rated value β is set to be about 0.98 m/S² in the present embodiment.

Moreover, it is preferable that the rated time is as short as possible within a range in which there is no possibility of detecting any erroneous output-stuck fault. If the rated time is set to be shorter, it becomes possible to detect an output-stuck fault in a shorter time. Furthermore, it is preferable that the rated value β is as small as possible within a range in which there is no possibility of detecting any erroneous output-stuck fault. If the rated value β is set to be small, it becomes possible to detect an output-stuck fault with a higher degree of precision. Incidentally, the rated time is set to be one second in the present embodiment.

And, if the difference between the maximum value and the minimum value of the physical car body acceleration is the rated value β or less, the ECU 2 judges that the difference is cause by an output-stuck fault such that the output of the car body acceleration sensor 1 is stuck in the state of not changing. Then, the ECU 2 resets the interim fault detection flag and sets a fault detection flag. At the point of time when the ECU 2 judges that the output-stuck fault has occurred and sets the fault detection flag, the ECU 2 lights the warning lamp 5 in the inside of the car, and stops the control function of the ABS to enable the operation of an ordinary brake. Moreover, the ECU 2 stores the fault code of the output-stuck fault of the car body acceleration sensor 1 in a not shown non-volatile storage medium.

On the other hand, as a broken line designated by a reference character C, if the difference between the maximum value and the minimum value of the physical car body acceleration is exceeding the rated value β, the ABS system judged that the difference is caused by the change of the car body acceleration working on the car body by the gravity, for example, when the car ascends or descends a sloping road having a large angle of inclination, and the ECU 2 does not set the fault detection flag. Moreover, the ECU 2 resets the interim fault detection flag, and stops the detection processing of the output-stuck fault.

Figure 3:
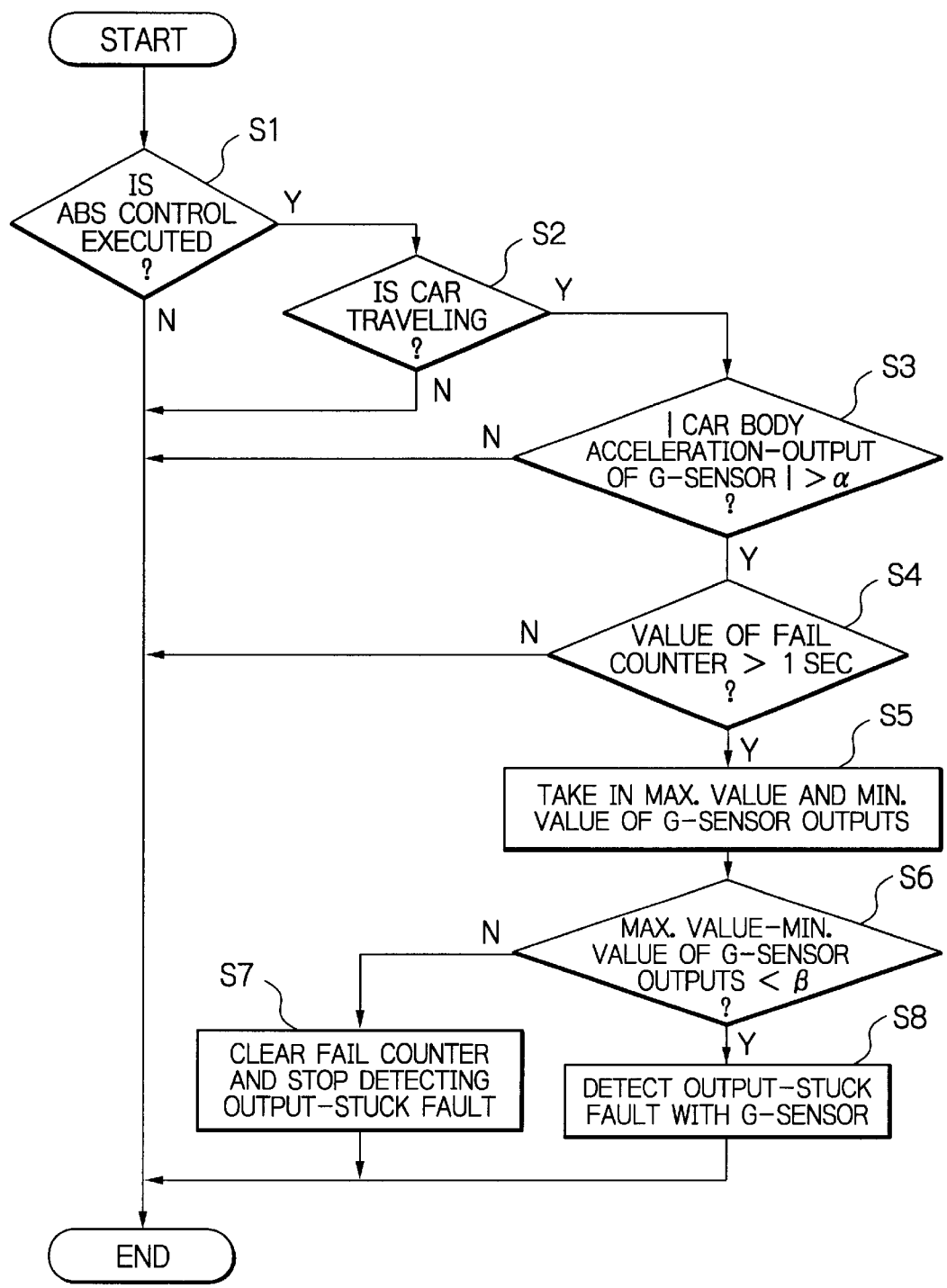
FIG. 3 is a flowchart showing a procedure of the detection of the output-stuck fault of the car body acceleration sensor shown in FIG. 2.

FIG. 3 is a flowchart showing a procedure of the detection of the output-stuck fault of the car body acceleration sensor 1 according to the present invention.

At first, the ECU 2 judges whether the ABS control of the ABS is being executed to the brake system (step S1). If the ABS control is being executed (no at the step S1), the ECU 2 does not perform the detection of the output-stuck fault of the car body acceleration sensor 1. On the contrary, if the ABS control is not being executed (yes at the step S1), the ECU 2 judges whether or not the car is traveling at a predetermined speed or more (step S2). If the car is not traveling at the predetermined speed or more, i.e. the car is stopping, (no at the step S2), the ECU 2 does not perform the detection of the output-stuck fault of the car body acceleration sensor 1. On the contrary, if the car is traveling at the predetermined speed or more (yes at the step S2), the ECU 2 performs the detection of the output-stuck fault of the car body acceleration sensor 1.

Successively, the ECU 2 obtains a relative difference between the logical car body acceleration operated on the basis of a wheel speed and the physical car body acceleration output from the car body acceleration sensor 1, and the ECU 2 compares the obtained relative difference with the rated value α (step S3). If the absolute value of the difference between the logical car body acceleration and the physical car body acceleration is the rated value α or less (no at the step S3), the ECU 2 considers that the car body acceleration sensor 1 is normal. If the absolute value exceeds the rated value α (yes at the step S3), the ECU 2 sets the above-mentioned interim fault detection flag at that point of time, and starts the counting up of the fail counter (step S4). Moreover, the ECU 2 always updates the minimum value and the maximum value of the physical car body acceleration from the point of time when the ECU 2 has started the counting up of the fail counter, and the ECU 2 stores the updated maximum value and the minimum value at every updating. Then, if the value of the fail counter during the period of time when the absolute value of the difference between the logical car body acceleration and the physical car body acceleration is exceeding the rated value α is one second or shorter (no at the step S4), the ECU 2 judges that the counting operation of the fail counter was caused by the instantaneous strong car body acceleration working on the car body as described above, and the ECU 2 resets the interim fault detection flag.

On the contrary, if the value of the fail counter during the period of time when the absolute value of the difference between the logical car body acceleration and the physical car body acceleration is exceeding the rated value α exceeds one second (yes at the step S4), the ECU 2 continuously obtains the stored maximum value and the stored minimum value of the physical car body acceleration during the period of time (step S5), and operates and computes the difference between the maximum value and the minimum value to compare the difference with the rated value β (step S6). If the difference between the maximum value and the minimum value is the rated value β or more (no at the step S6), the ECU 2 judges that the difference was caused by the change of the car body acceleration working on the car body by the gravity, for example, when the car ascended or descended a sloping road having a large angle of inclination as described above, and the ECU 2 does not sets the fault detection flag of the output stuck fault of the car body acceleration sensor 1. Moreover, the ECU 2 resets the interim fault detection flag and stops the detection processing of the output-stuck fault (step S7).

Then, if the difference between the maximum value and the minimum value is smaller than the rated value β (yes at the step S6), the ECU 2 judges that the difference was caused by an output-stuck fault such that the output of the car body acceleration sensor 1 has been stuck in the state of not changing. Then, the ECU 2 resets the interim fault detection flag and sets the output-stuck fault detection flag (step S8).

Thereby, it becomes possible not to detect any erroneous output-stuck fault when a car ascends or descends a sloping road having a large angle of inclination though the car body acceleration sensor 1 is normal, and it also becomes possible to detect any output-stuck fault of the car body acceleration sensor 1 precisely even in the situation in which the car body acceleration working on the car body is small.

Moreover, as another embodiment, an embodiment in which a relative difference of change quantities of car body acceleration is operated by the comparison of the change quantities in place of the operation of the relative acceleration difference by the comparison of the of the car body acceleration in the former embodiment can be cited. In such a way, by the comparison of the relative difference between the change quantity of the logical car body acceleration and the change quantity of the physical car body acceleration, it is also possible to implement the present invention. And then, the similar operation and the similar advantages to those of the former embodiment can be obtained. Moreover, by the further comparison of the change quantities of the car body acceleration, the result of the comparison is not influenced by the discrepancy of the relative acceleration difference between the logical car body acceleration and the physical car body acceleration. Consequently, it becomes possible to detect the output-stuck fault of the car body acceleration sensor with a higher degree of accuracy.

Incidentally, the scope of the present invention is not limited to the above-mentioned embodiments, and various variations can be performed without departing from the scope of the claims. Needless to say, these variations are included in the scope of the present invention.

According to the present invention, no erroneous output-stuck fault is detected when a car ascends or descends a sloping road having a large angle of inclination though a car body acceleration sensor is normal, and it becomes possible to detect an output-stuck fault of the car body acceleration sensor accurately even in the state in which the car body acceleration working on a car body is small.

What is claimed is:

1. A method for detecting an output-stuck fault of a car body acceleration sensor installed in a car having an anti-lock braking system for a car, said method comprising the steps of:
    operating a relative acceleration difference between logical car body acceleration operated on a basis of a wheel speed and physical car body acceleration detected by said car body acceleration sensor;
    measuring a duration time of a state in which the acceleration difference is exceeding a first rated value;
    storing minimum acceleration and maximum acceleration of the physical car body acceleration during the state in which the acceleration difference is exceeding the first rated value; and
    judging that said car body acceleration sensor is in its output-stuck fault state if a difference between the stored minimum acceleration and the stored maximum acceleration is a second rated value or less at a point of time when the duration time of the state in which the acceleration difference is exceeding the first rated value exceeds a rated time.

2. The method according to claim 1, wherein said method performs detection of the output-stuck fault of said car body acceleration sensor only when a control of said anti-lock braking system is not executed and said car is traveling at a predetermined speed or more.

3. The method according to claim 1, said method further comprising the steps of:
    lighting a fault indicating lamp to inform the fault to a driver when said car body acceleration sensor is judged to be in the output-stuck fault state; and
    storing a fault code in a non-volatile storage medium.

4. A method for detecting an output-stuck fault of a car body acceleration sensor installed in a car having an anti-lock braking system for a car, said method comprising the steps of:
    operating a relative change quantity difference between a change quantity of logical car body acceleration per unit time, the change quantity being operated on a basis of a wheel speed, and a change quantity of physical car body acceleration per unit time, the physical car body acceleration being detected by said car body acceleration sensor;
    measuring a duration time of a state in which the change quantity difference is exceeding a first rated value;
    storing a maximum value of the change quantity of the physical car body acceleration per unit time during the state in which the change quantity difference is exceeding the first rated value; and judging that said car body acceleration sensor is in its output-stuck fault state if the stored maximum value of the change quantity is a second rated value or less at a point of time when the duration time of the state in which the change quantity difference is exceeding the first rated value exceeds a rated time.

5. The method according to claim 4, wherein said method performs detection of the output-stuck fault of said car body acceleration sensor only when a control of said anti-lock braking system is not executed and said car is traveling at a predetermined speed or more.

6. The method according to claim 4, said method further comprising the steps of:
lighting a fault indicating lamp to inform the fault to a driver when said car body acceleration sensor is judged to be in the output-stuck fault state; and
storing a fault code in a non-volatile storage medium.

7. An apparatus for detecting an output-stuck fault of a car body acceleration sensor installed in a car having an anti-lock braking system for a car, said apparatus comprising:
a wheel speed sensor outputting an alternating current signal having a frequency proportional to a rotational speed of a wheel of the car;
a control section having an operation function for operating a wheel speed by receiving the alternating current signal from said wheel speed sensor to compute car body acceleration logically on a basis of the wheel speed; and
a car body acceleration sensor for detecting car body acceleration physically to output the detected car body acceleration to said control section;
wherein said control section comprises:
means for operating a relative acceleration difference between the logical car body acceleration operated on a basis of the wheel speed and the physical car body acceleration detected by said car body acceleration sensor;
means for measuring a duration time of a state in which the acceleration difference is exceeding a first rated value;
means for storing minimum acceleration and maximum acceleration of the physical car body acceleration during the state in which the acceleration difference is exceeding the first rated value; and
means for judging that said car body acceleration sensor is in its output-stuck fault state if a difference between the stored minimum acceleration and the stored maximum acceleration is a second rated value or less at a point of time when the duration time of the state in which the acceleration difference is exceeding the first rated value exceeds a rated time.

8. The apparatus according to claim 7, wherein said control section further comprises means for performing detection of the output-stuck fault of said car body acceleration sensor only when a control of said anti-lock braking system is not executed and said car is traveling at a predetermined speed or more.

9. The apparatus according to claim 7, wherein said control section further comprises:
means for lighting a fault indicating lamp to inform the fault to a driver when said control section judges that said car body acceleration sensor is in its output-stuck fault state; and
means for storing a fault code in a non-volatile storage medium.

10. The apparatus according to claim 7, wherein said car body acceleration sensor is an analog G-sensor.

11. An apparatus for detecting an output-stuck fault of a car body acceleration sensor installed in a car having an anti-lock braking system for a car, said apparatus comprising:
a wheel speed sensor outputting an alternating current signal having a frequency proportional to a rotational speed of a wheel of the car;
a control section having an operation function for operating a wheel speed by receiving the alternating current signal from said wheel speed sensor to compute car body acceleration logically on a basis of the wheel speed; and
a car body acceleration sensor for detecting car body acceleration physically to output the detected car body acceleration to said control section;
wherein said control section comprises:
means for operating a relative change quantity difference between a change quantity of the logical car body acceleration per unit time, the change quantity being operated on a basis of the wheel speed, and a change quantity of the physical car body acceleration per unit time, the physical car body acceleration being detected by said car body acceleration sensor;
means for measuring a duration time of a state in which the change quantity difference is exceeding a first rated value;
means for storing a maximum value of the change quantity of the physical car body acceleration per unit time during the state in which the change quantity difference is exceeding the first rated value; and
means for judging that said car body acceleration sensor is in its output-stuck fault state if the stored maximum value of the change quantity is a second rated value or less at a point of time when the duration time of the state in which the change quantity difference is exceeding the first rated value exceeds a rated time.

12. The apparatus according to claim 11, wherein said control section further comprises means for performing detection of the output-stuck fault of said car body acceleration sensor only when a control of said anti-lock braking system is not executed and said car is traveling at a predetermined speed or more.

13. The apparatus according to claim 11, wherein said control section further comprises:
means for lighting a fault indicating lamp to inform the fault to a driver when said control section judges that said car body acceleration sensor is in its output-stuck fault state; and
means for storing a fault code in a non-volatile storage medium.

14. The apparatus according to claim 11, wherein said car body acceleration sensor is an analog G-sensor.

15. An anti-lock braking system for a car, said system being equipped with an apparatus for detecting an output-stuck fault of a car body acceleration sensor, said apparatus comprising:
a wheel speed sensor outputting an alternating current signal having a frequency proportional to a rotational speed of a wheel of the car;
a control section having an operation function for operating a wheel speed by receiving the alternating current signal from said wheel speed sensor to compute car body acceleration logically on a basis of the wheel speed; and a car body acceleration sensor for detecting car body acceleration physically to output the detected car body acceleration to said control section;

wherein said control section comprises:

means for operating a relative acceleration difference between the logical car body acceleration operated on a basis of the wheel speed and the physical car body acceleration detected by said car body acceleration sensor;

means for measuring a duration time of a state in which the acceleration difference is exceeding a first rated value;

means for storing minimum acceleration and maximum acceleration of the physical car body acceleration during the state in which the acceleration difference is exceeding the first rated value; and means for judging that said car body acceleration sensor is in its output-stuck fault state if a difference between the stored minimum acceleration and the stored maximum acceleration is a second rated value or less at a point of time when the duration time of the state in which the acceleration difference is exceeding the first rated value exceeds a rated time.

16. An anti-lock braking system for a car, said system being equipped with an apparatus for detecting an output-stuck fault of a car body acceleration sensor, said apparatus comprising:

a wheel speed sensor outputting an alternating current signal having a frequency proportional to a rotational speed of a wheel of the car;

a control section having an operation function for operating a wheel speed by receiving the alternating current signal from said wheel speed sensor to compute car body acceleration logically on a basis of the wheel speed; and a car body acceleration sensor for detecting car body acceleration physically to output the detected car body acceleration to said control section;

wherein said control section comprises:

means for operating a relative change quantity difference between a change quantity of the logical car body acceleration per unit time, the change quantity being operated on a basis of the wheel speed, and a change quantity of the physical car body acceleration per unit time, the physical car body acceleration being detected by said car body acceleration sensor;

means for measuring a duration time of a state in which the change quantity difference is exceeding a first rated value;

means for storing a maximum value of the change quantity of the physical car body acceleration per unit time during the state in which the change quantity difference is exceeding the first rated value; and means for judging that said car body acceleration sensor is in its output-stuck fault state if the stored maximum value of the change quantity is a second rated value or less at a point of time when the duration time of the state in which the change quantity difference is exceeding the first rated value exceeds a rated time.

* * * * *